Patented Dec. 5, 1950

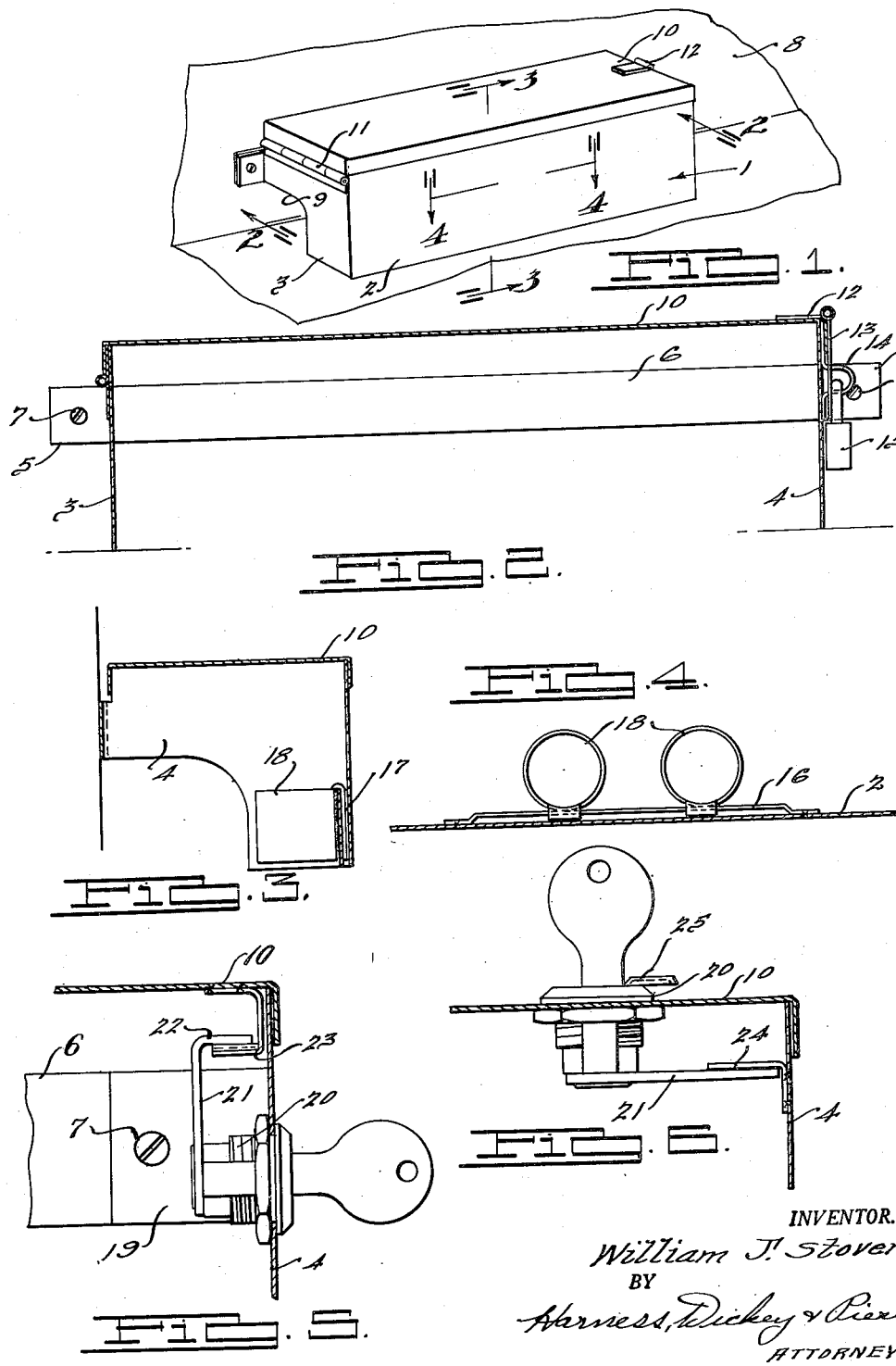

2,532,681

UNITED STATES PATENT OFFICE 2,532,681

EXTERMINATOR PROTECTING DEVICE

William J. Stover, Detroit, Mich.

Application January 19, 1946, Serial No. 642,160

2 Claims. (Cl. 43—131)

This invention relates to protecting devices for exterminating materials, and particularly to a device for protecting rodent exterminating and like poisonous materials from unauthorized access.

Substantial success has result from the use of such new exterminating materials as 1080, Antu and the like, when employed for killing rodents such as rats and mice. The use of such materials, however, has been substantially retarded because of their dangerous nature in that only small quantities are required for exterminating the rodents, and the lives of dogs, cats and other animals and often the lives of humans are endangered by the use of the materials.

The present invention pertains to a device for permitting the free use of such dangerous materials for the extermination of rodents while protecting the lives of other animals. The device embodies a casing comprising a front face and two end walls which are joined across the open rear side by an attaching bar by which the device may be securely anchored to the baseboard of a wall, to the side of a building or to any other surface. Each of the end walls of the device has a recess through which the rodent may enter, and since a bottom is omitted the rodent may enter while continuing to walk on the same material.

A cover is provided on the casing which is preferably hinged thereto and locked in position to prevent unauthorized access to the interior and to the exterminating material therein. The inner face of the front wall is preferably provided with a holding bar for cups in which the exterminating material may be disposed, and one or a plurality of the cups may be utilized depending upon the different kinds of materials which are to be utilized. A hasp of conventional form may be secured to the cover engageable with a staple on the casing to which a padlock may be secured. A barrel lock may be utilized having a latching bar which engages a detent on the cover or on the casing, depending upon the location of the barrel lock on the casing or cover, respectively.

Accordingly, the main objects of the invention are: to provide a protective device for exterminating materials which is foolproof and which may be locked in a manner to prevent access to the interior of the device or the removal of the device from its support; to provide a casing having openings in the end walls at the rear bottom corners to be aligned with the wall support along which the rodents usually travel; to provide a protective device for a rodent exterminating poison comprising a casing with end and front walls and a cover which may be locked in position and with supporting means by which the open face of the casing may be secured to a supporting wall in position to have the rodent enter and leave the openings while traveling along the wall and on the ground or floor upon which the device rests so that the material upon which the rodent travels is not changed when entering the box; to provide a device for protecting rodent exterminating poisons which has a hinged lid which may be locked in position to prevent access to the poisons or to the attaching means by which the device is secured to a supporting member; to provide a protective device for exterminating poisons with removable cups hung upon a supporting bar by flanges extending rearwardly and downwardly from the cups; and, in general, to provide a protecting device for exterminating materials which is simple in construction and economical of manufacture.

Other objects and features of novelty of the invention will be specifically pointed out or will become apparent when referring, for a better understanding of the invention, to the following description taken in conjunction with the accompanying drawing, wherein:

Figure 1 is a perspective view of a protective device for exterminating materials embodying features of this invention;

Fig. 2 is an enlarged sectional view of the structure illustrated in Fig. 1, taken on the line 2—2 thereof;

Fig. 3 is an enlarged sectional view of the structure illustrated in Fig. 1, taken on the line 3—3 thereof;

Fig. 4 is an enlarged sectional view of a part of the structure illustrated in Fig. 1, taken on the line 4—4 thereof;

Fig. 5 is an enlarged broken view of structure, similar to that illustrated in Fig. 2, showing a modified form thereof; and Fig. 6 is a view of structure, similar to that illustrated in Fig. 5, showing a further form which the invention may assume.

The protective device for exterminating materials is illustrated in the figures as embodying a casing 1 having a front wall 2 and end walls 3 and 4 which are disposed in parallel relation to each other and at right angles to the front wall 2. Tabs 5 extend outwardly from the rear ends of the end walls 3 and 4 and are secured to an attaching bar 6 which extends across the open face of the casing. Screws 7 extend through apertures in the tabs 5 and bar 6 for securing the casing against a supporting wall 8 which forms a closure therefor.

Each of the end walls 3 and 4 has the rear and bottom corner portions cut away to provide apertures 9 through which the rodent may enter and leave the device when traveling along the wall in the usual manner. The bottom of the casing is left open so that the rodent will be traveling on the ground, floor or the same material it was traveling on before entering the device, as the change of material might otherwise cause it to become cautious so that it will not enter the opening. A cover 10 is secured to the end wall 3 by a hinge 11 and a hasp 12 is secured on the opposite end of the cover having a hinged portion 13 which has an aperture for receiving a staple 14 projecting from the outer face of the side wall 4 and through which a lock 15 may be secured for locking the cover against unauthorized opening.

On the inner face of the front wall 2 of the casing 1, a supporting bar 16 is secured in spaced relation to the face of the wall for receiving a flange 17 of a cup 18 in which the exterminating material is placed. Any number of the cups 18 may be supported on the bar 16 so that larger amounts of any one material may be employed or several different materials may be placed within the device at the same time.

In Fig. 5, a further form of the invention is illustrated, that wherein tabs 19, similar to the tabs 5, are bent inwardly of the side walls 3 and 4 rather than outwardly, as illustrated in Figs. 1 to 4. A securing bar 6 spans the tabs 19 to which it is secured and further secured by screws 7 which extend through apertures in the tabs and bar when supporting the device to the wall 8. With this arrangement, when the cover 10 is locked in position, access to the screws for removing the casing is prevented. The side wall 4, as illustrated in Fig. 5, supports a barrel lock 20 having a locking bar 21 with a latching end 22 which is movable into engagement with a detent 23 secured to the inner surface of the cover 10. When the key is placed within the barrel of the lock 20, the lock may be rotated to move the locking bar 21 and the latching end 22 out of engagement with the detent 23 so that the cover 10 may be opened. After the cover has been moved to closed position, the reverse movement of the barrel lock and locking bar 21 moves the latching end 22 over the detent 23 to securely lock the cover in position.

In Fig. 6 the barrel lock 20 is illustrated as being applied to the cover 10 of the device with the latching bar 21 in position to be moved under a detent 24 projecting inwardly from the inner face of the side wall 4. A pivoted cover 25, of conventional form, may be provided on the outer face of the barrel lock for covering the keyhole when the key is removed to prevent the collection of moisture, dirt or grime therein. It is to be understood that a similar cover 25 may be employed on the lock illustrated in Fig. 5.

What is claimed is:

1. A protecting device for exterminating material embodying a casing having a front wall and two end walls extending rearwardly therefrom, the bottom rear corners of the end walls having notches to provide apertures through which rodents may enter and leave the casing when the apertures are completed by the wall and floor to which the device is secured, a supporting bar secured to the rear edges of the end walls and disposed across the rear open face of the casing, said bar containing at least one aperture located between the end walls by which the bar and casing are secured to a support, and a cover for said casing hinged to one of said walls.

2. A protecting device for exterminating material embodying a casing having a front wall and two end walls extending rearwardly therefrom, the bottom rear corners of the end walls having notches to provide apertures through which rodents may enter and leave the casing when the apertures are completed by the wall and floor to which the device is secured, a supporting bar secured to the rear edges of the end walls and disposed across the rear open face of the casing, said bar containing at least one aperture located between the end walls by which the bar and casing are secured to a support, a cover for said casing hinged to one of said walls, and a lock for securing said cover in closed position and preventing access to said bar to prevent the removal of the casing from its support.

WILLIAM J. STOVER.

REFERENCES CITED

The following references are of record in the file of this patent:

UNITED STATES PATENTS

| Number | Name | Date |
| --- | --- | --- |
| 157,762 | Reichert | Dec. 15, 1874 |
| 794,323 | Small | July 11, 1905 |
| 1,321,360 | Bright | Nov. 11, 1919 |
| 1,515,963 | Morrell | Nov. 18, 1924 |
| 1,758,674 | Morton | May 13, 1930 |
| 1,964,611 | Watson | June 26, 1934 |
| 2,020,502 | Goddard | Nov. 12, 1935 |